(12) United States Patent
Oh et al.

(10) Patent No.: US 7,643,101 B2
(45) Date of Patent: Jan. 5, 2010

(54) POLYCRYSTALLINE LIQUID CRYSTAL DISPLAY DEVICE AND FABRICATION METHOD THEREOF

(75) Inventors: Kum-Mi Oh, Gyeonggi-Do (KR); Myoung-Su Yang, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 208 days.

(21) Appl. No.: 10/975,003

(22) Filed: Oct. 28, 2004

(65) Prior Publication Data

US 2005/0094041 A1    May 5, 2005

(30) Foreign Application Priority Data

Nov. 3, 2003    (KR) .................. 10-2003-0077365

(51) Int. Cl.
  *G02F 1/136* (2006.01)
  *H01L 27/14* (2006.01)
  *H01L 21/84* (2006.01)

(52) U.S. Cl. .................. 349/43; 349/42; 257/72; 438/151; 438/166

(58) Field of Classification Search .................. 349/42, 349/43; 257/72; 438/151, 166
See application file for complete search history.

(56) References Cited

U.S. PATENT DOCUMENTS

| | | | | |
|---|---|---|---|---|
| 5,648,662 A | * | 7/1997 | Zhang et al. ............... 257/59 |
| 5,953,595 A | * | 9/1999 | Gosain et al. ............... 438/158 |
| 6,093,586 A | * | 7/2000 | Gosain et al. ............... 438/162 |
| 6,335,776 B1 | * | 1/2002 | Kim et al. ............... 349/129 |
| 6,636,280 B1 | * | 10/2003 | Miyazawa et al. ............ 349/43 |
| 6,709,901 B1 | * | 3/2004 | Yamazaki et al. ........... 438/149 |
| 2001/0048491 A1 | * | 12/2001 | Tanaka et al. ............... 349/44 |
| 2002/0084459 A1 | * | 7/2002 | Choi et al. ............... 257/72 |

FOREIGN PATENT DOCUMENTS

KR    100200705    3/1999
KR    1020020027902    4/2002

OTHER PUBLICATIONS

Communication from Korean Patent Office dated Sep. 20, 2005.

* cited by examiner

*Primary Examiner*—Michael H Caley
(74) *Attorney, Agent, or Firm*—McKenna Long & Aldridge

(57) ABSTRACT

A fabrication method of a polysilicon LCD device includes: forming a gate electrode on a substrate; forming a gate insulating layer over the gate electrode; forming a first amorphous semiconductor layer and a second amorphous semiconductor layer over the gate insulating layer; crystallizing the first and second amorphous semiconductor layers; forming source/drain electrodes on the crystallized second semiconductor layer; forming a passivation layer over the source/drain electrodes; and forming a pixel electrode connected to one of the source/drain electrodes.

7 Claims, 7 Drawing Sheets

POLYCRYSTALLINE LIQUID CRYSTAL DISPLAY DEVICE AND FABRICATION METHOD THEREOF

The present invention claims the benefit of Korean Patent Application No. 2003-077365 filed in Korea on Nov. 3, 2003, which is hereby incorporated by reference.

BACKGROUND OF THE INVENTION

1. Field of the Invention

The present invention relates to a liquid crystal display (LCD) device and more particularly, to a polycrystalline LCD device and a fabrication method thereof.

2. Description of the Related Art

Generally, LCD devices can be categorized by how the driving circuit unit is positioned relative to the display unit. A separated driving circuit unit-type LCD device has a display unit for displaying an image and a driving circuit unit for driving the display unit, which are connected to each other by a tape carrier package (TCP) or with other types of lead bonding structures. On the other hand, in an integrated driving circuit unit-type LCD device, the display unit and the driving circuit unit are on the same substrate. Accordingly, the integrated driving circuit unit-type LCD device can be more easily fabricated than the separated driving circuit unit-type LCD device.

To fabricate the integrated driving circuit unit-type LCD device, a polysilicon TFT, which has a polysilicon channel layer, is typically used. A polysilicon TFT has excellent channel mobility as compared to an amorphous TFT, which has amorphous silicon as a channel layer. The electric mobility of the amorphous TFT is 0.1~1 cm$^2$/Vsec while an electric mobility of the polysilicon TFT fabricated using an excimer laser exceeds 100 cm$^2$/Vsec. Thus, a polysilicon TFT is suitable for fabricating an LCD device that operates at a high speed.

Figure 1:
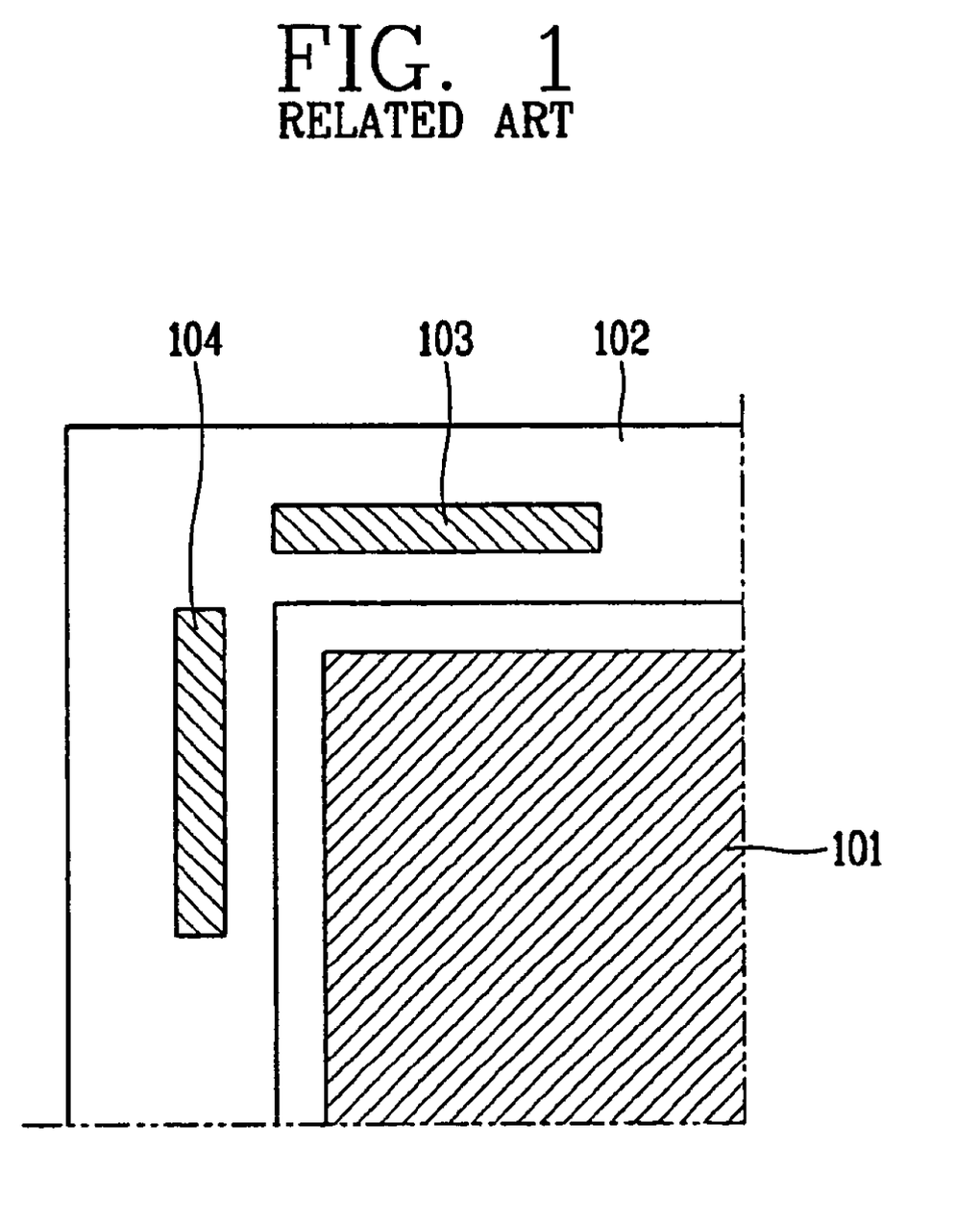
FIG. 1 is a plan view illustrating a schematic structure of an integrated driving circuit unit-type polysilicon LCD device in accordance with the related art.

FIG. 1 is a plan view illustrating a schematic structure of an integrated driving circuit unit-type polysilicon LCD device in accordance with the related art. Referring to FIG. 1, the integral driving circuit unit-type LCD device using a polysilicon TFT includes a display unit 101 in which unit pixels are arranged as a matrix on a substrate and a driving circuit unit 102 arranged at an outer periphery of the display unit for driving the display unit. The driving circuit unit 102 includes a gate driver 104 for supplying a pulse signal to a gate line and a data driver 103 for supplying an image signal to a data line. In the driving circuit unit 102, complementary metal oxide semiconductor (CMOS) transistors, which include a P-type TFT and our N-type TFT, are respectively connected to each of the unit pixels of the display unit.

Figure 2A:
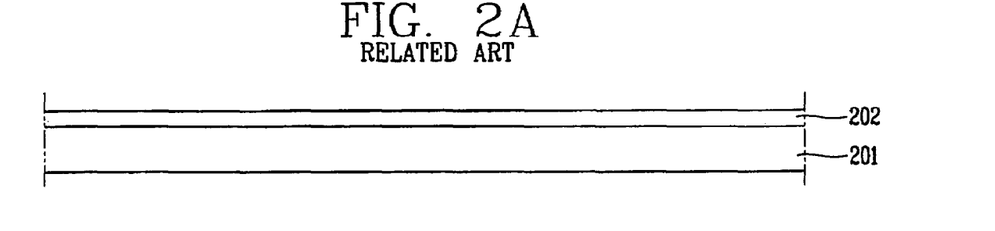
FIGS. 2A to 2I are cross-sectional views illustrating a fabrication process of a polysilicon LCD device in accordance with the related art.

FIGS. 2A to 2I are views illustrating a fabrication process of a polysilicon LCD device in accordance with the related art. Referring to FIG. 2, a method for fabricating a polysilicon LCD device having a driving circuit unit with a P-type TFT and an N-type TFT along with a display unit having either a P-type TFT or an N-type TFT in the unit pixels will be explained. As shown in FIG. 2A, a buffer layer 202, such as a silicon oxide layer (SiO$_2$) is deposited on a transparent substrate 201. Then, an amorphous silicon layer 203 is deposited on the buffer layer 202 by a plasma enhanced chemical vapor deposition (PECVD). Subsequently, a thermal process is performed at approximately 400° C. to remove hydrogen from the amorphous silicon layer. The hydrogen is removed to prevent the hydrogen in the amorphous silicon layer from exploding during a subsequent crystallization process of the amorphous silicon layer. In other words, the thermal process prevents the substrate from being damaged by the explosion of hydrogen during crystallization.

Then, the amorphous silicon layer is further processed to crystallize the amorphous silicon layer. However, in the case of crystallizing the amorphous layer by a high-heat thermal process, the glass that is used as a substrate may be deformed by the high-heat. Therefore, in a process for fabricating a polysilicon TFT using a glass substrate, a laser annealing method is used to form crystalline silicon from amorphous silicon so that the glass substrate can be kept at a low temperature while only the amorphous silicon is subjected to an instantaneous high-heat thermal process. One laser annealing method is an excimer laser that irradiates the amorphous silicon on the substrate to crystallize the amorphous silicon on the entire substrate. The crystallized silicon is generally a polysilicon. After the crystallization, the polysilicon is dry-etched to define an active layer.

Figure 2B:
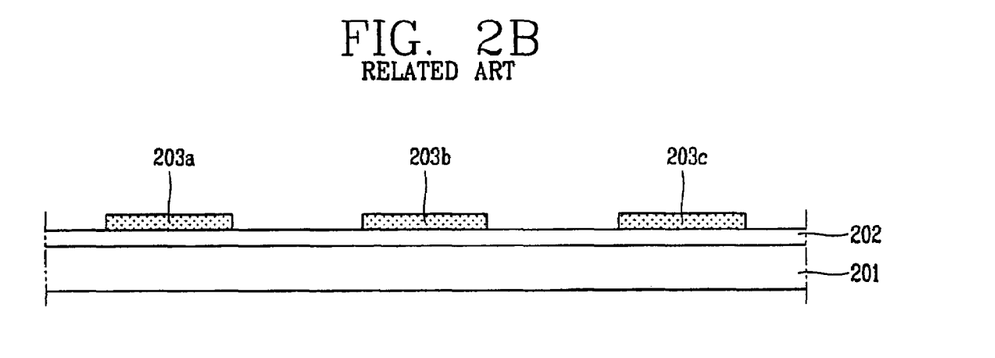
Figure 2C:
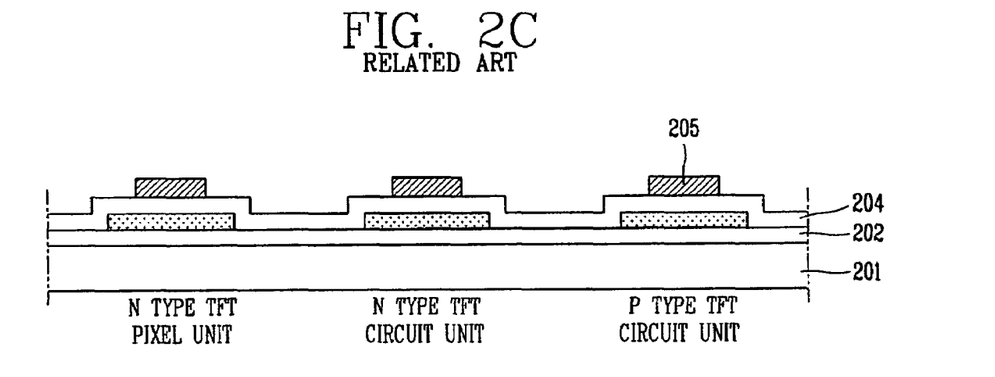

FIG. 2B illustrates an amorphous layer formed on the silicon oxide layer 202 that has been crystallized and patterned as a TFT active layer 203a of the display unit, an N-type TFT active layer 203b, and a P-type TFT active layer 203c. After forming the active layers 203a, 203b, and 203c, a gate insulating layer 204 of SiO$_2$ or SiN$_x$ is formed on the entire surface of the substrate 201 to protect and insulate the active layers. Then, a gate metal layer is further formed on the gate insulating layer 204 by a sputtering method. The gate metal layer is patterned by a photolithography process to form the gate electrode 205 for the TFT of the display unit and the N-type TFT of the CMOS.

To prevent an N-type TFT from having a leakage current, the display unit and/or the driving circuit unit is fabricated as a lightly doped drain (LDD) transistors. To form such transistors, an impurity ion injection process is performed. To form the N-type TFT, impurities corresponding to the fifth group of the periodic table, such as P or As, are used to form the P-type TFT. To form the p-type TFT, impurities corresponding to the third group of the periodic table, such as B, are used.

Figure 2D:
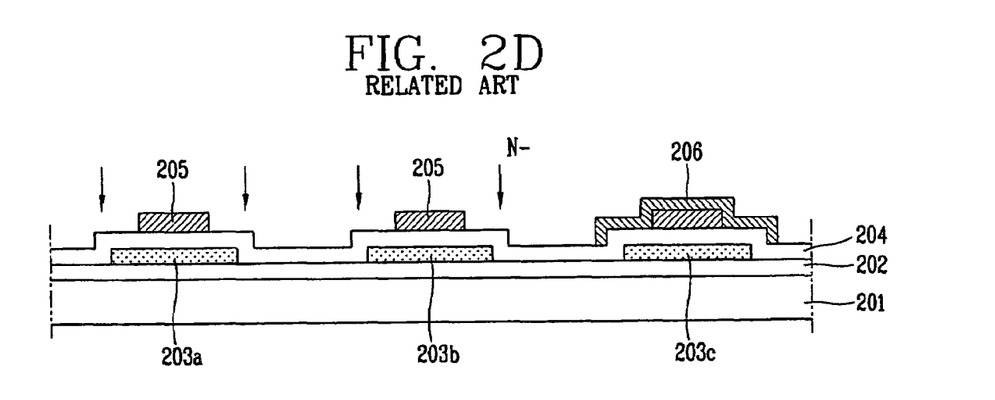

Referring to FIG. 2D, a process for forming the LDD-type TFT will be explained. A photoresist is deposited over the entire substrate 201 and the gate electrodes 205 by a spin coating method. Then, an exposure/development process is performed such that only the photoresist pattern 206 that shields the P-type TFT region remains.

The exposed gate electrodes 205 and the photoresist pattern 206 that shields the P-type TFT are used as a mask for injecting ions from the fifth group of the periodic table, such as P, at a low concentration. As a result, a low concentration of impurity ions are injected into the active layers 203a and 203b of the N-type TFTs formed in the display unit and in the driving circuit unit. The regions of the active layer in the N-type TFTs shielded by the gate line constitute channel layers. Then, the photoresist pattern 206 is removed.

Figure 2E:
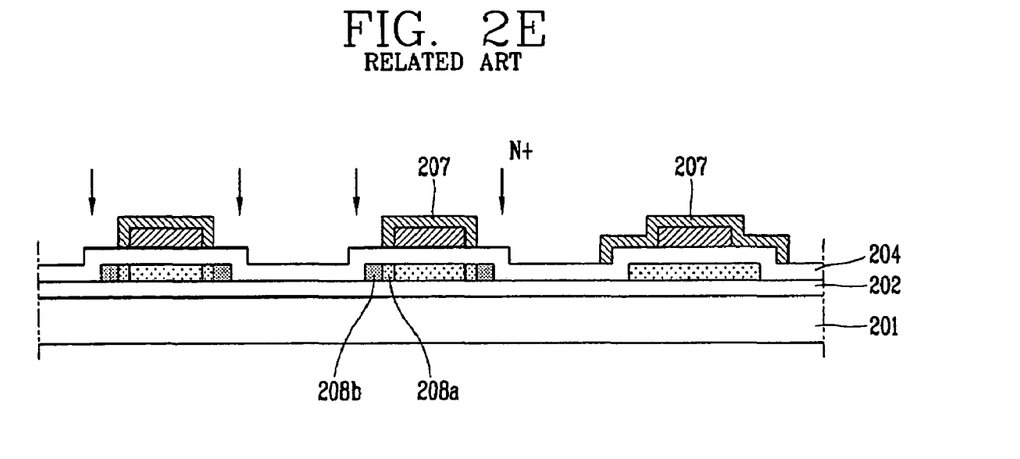

Next, a photoresist pattern forming process for injecting a high concentration of impurity ions into source/drain regions 208b of the N-type TFTs is performed. That is, as shown in FIG. 2E, a photoresist is deposited over the substrate, including the gate electrode 205, and is then patterned with an exposure and a development to form a photoresist pattern 207 that shields the P-type TFT and the LDD region 208a of the N-type TFTs. The photoresist 207 is used as a mask while injecting a high concentration of N+ impurity ions into the source/drain regions to complete the source and drain regions of the LDD N-type TFTs.

Figure 2F:
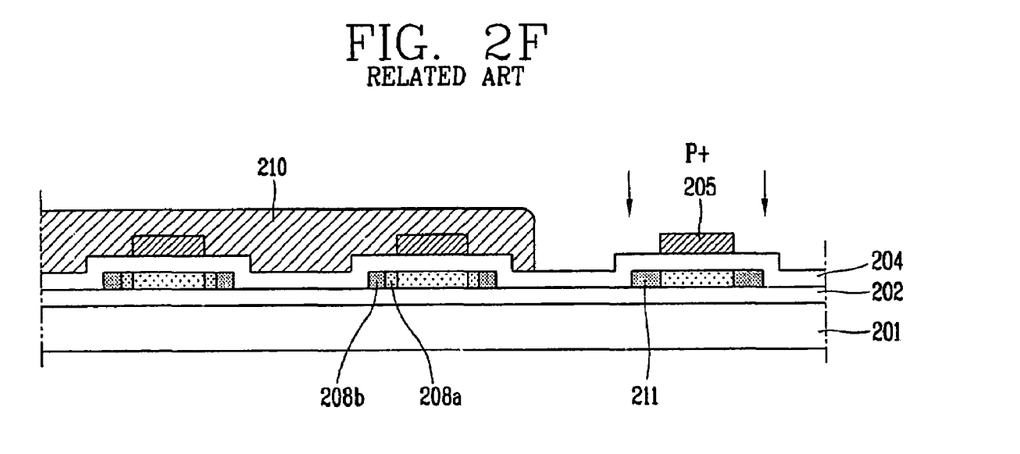

Then, a process for forming the P-type TFT is performed. As shown in FIG. 2F, a photoresist pattern 210 for entirely shielding the N-type TFT and exposing the P-type TFT is formed, and then ions from the third group of the periodic table, such as B, are injected to form the P-type TFT.

Figure 2G:
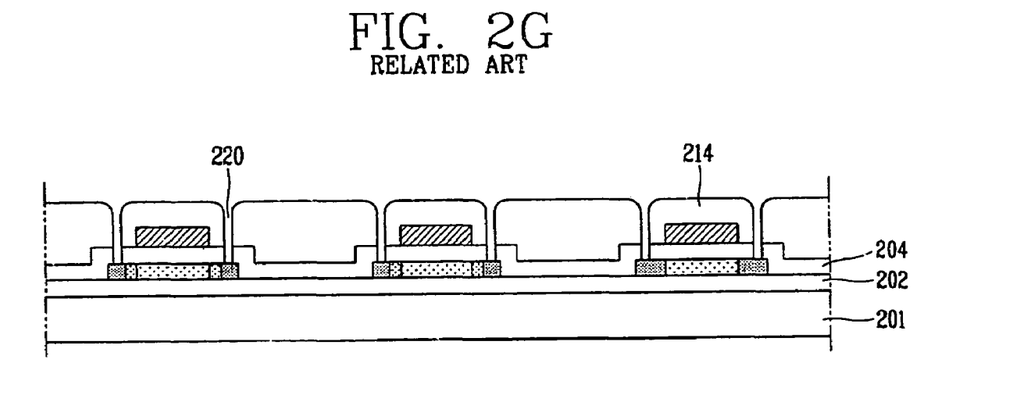

As shown in FIG. 2G, after injecting impurity ions into the source/drain regions, an insulating layer 214, such as silicon nitride or silicon oxide is formed over the substrate 205. Then, a contact hole 220 is formed in the insulating layer 214 to expose the source/drain regions of the TFTs. The contact holes 220 are formed in both the display unit and the driving circuit unit.

Figure 2H:
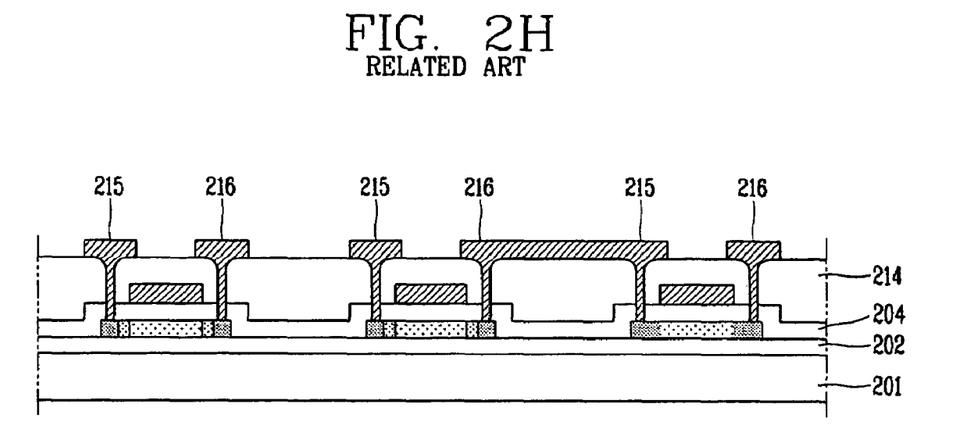

Next, a conductive layer is formed in the contact holes 220, and is then patterned by a photolithography process to form source electrodes 215 and a drain electrodes 216. FIG. 2H illustrates the source/drain electrodes and the interconnection of the CMOS TFTs.

Figure 2I:
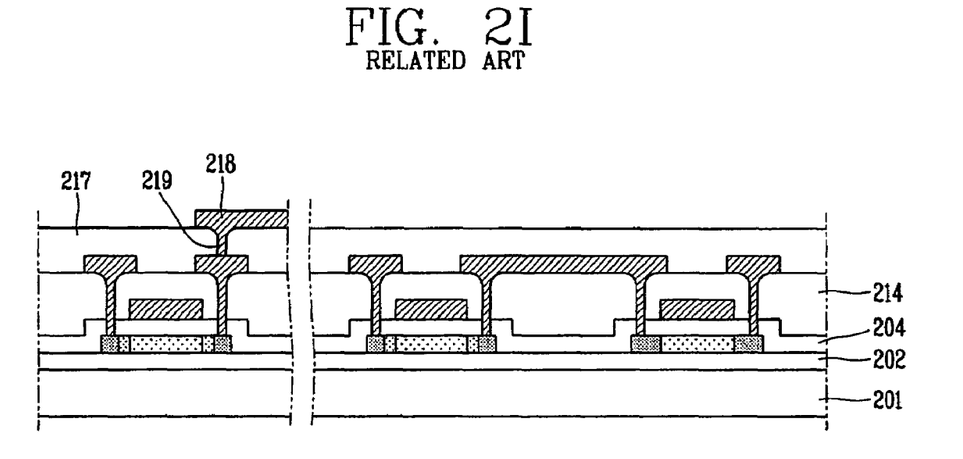

As shown in FIG. 2I, a passivation layer 217, such as silicon oxide or an organic insulator, is formed over the TFTs to protect the TFTs formed after the above processes, and a contact hole 219 is formed in the passivation layer 217.

Next, a transparent layer, such as an ITO layer or an IZO layer, is formed as a pixel electrode on the passivation layer 217 and into the contact hole 219, and then is patterned to form a pixel electrode 218.

As aforementioned, the LCD device uses an LDD-type polysilicon transistor. Although it has an excellent operation characteristics, such a transistor has a very complicated fabricating process. Thus, it would be more economical and efficient to reduce the number of processing steps in fabricating a polysilicon transistor of an LCD device.

SUMMARY OF THE INVENTION

Accordingly, the present invention is directed to a polycrystalline liquid crystal display (LCD) device and fabrication method thereof that substantially obviates one or more of the problems due to limitations and disadvantages of the related art.

An object of the present invention is to reduce the number of fabricating steps in producing a polycrystalline LCD device.

Another object of the present invention is to reduce the number of masks used for forming a bottom gate type TFT.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a fabrication method of a polysilicon LCD device including: forming a gate electrode on a substrate; forming a gate insulating layer over the gate electrode; forming a first amorphous semiconductor layer and a second amorphous semiconductor layer over the gate insulating layer; crystallizing the first and second amorphous semiconductor layers; forming source/drain electrodes on the crystallized second semiconductor layer; forming a passivation layer over the source/drain electrodes; and forming a pixel electrode connected to one of the source/drain electrodes.

In another aspect, a polysilicon LCD device includes: a gate electrode on a substrate; a gate insulating layer over the gate electrode; a first intrinsic polysilicon semiconductor layer over the gate insulating layer; a pair of doped second polysilicon layers on the first intrinsic polysilicon semiconductor layer; source/drain electrodes respectively positioned on the pair of doped second polysilicon layers; a passivation layer over the source/drain electrodes; and a pixel electrode connected to one of the source/drain electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

An integrated driving circuit type LCD device has a driving circuit unit formed on the substrate of the display unit, and has an N-type TFT and a P-type TFT that are otherwise known as a complementary metal oxide silicon (CMOS). In embodiments of the present invention, an LDD-type TFT is not formed, and the N-type TFT has a similar fabrication process as the P-type TFT.

Figure 3:
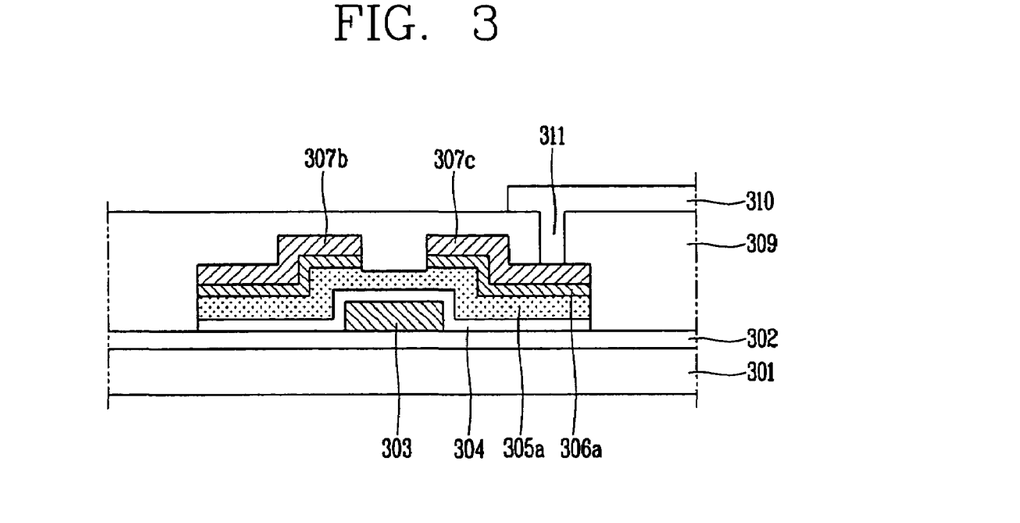
FIG. 3 is a cross-sectional view showing a structure of a P-type TFT according to an embodiment of the present invention.

FIG. 3 is a cross-sectional view showing a structure of a P-type polysilicon LCD device according to an embodiment of the present invention. As shown in FIG. 3, a buffer layer 302 of a silicon oxide layer is formed on a transparent substrate 301. The buffer layer 302 prevents particles generated during a subsequent crystallization process of an amorphous silicon layer from being introduced into a crystallized silicon layer.

On the buffer layer 302, a gate electrode 303 composed of Al, Mo, Cu, or a double layer of Al and Mo is formed. On the gate electrode 303, a gate insulating layer 304 made of $Sio_2$ or SiNx is deposited or grown to insulate the gate electrode 303. An active layer, which has impurity ions, is formed on the gate insulating layer 304. The active layer includes a first semiconductor layer 305a and a pair of second semiconductor layers 306a, which are separated from each other. In the case of the P-type TFT, ions, such as boron or other ions corresponding to the third group of the periodic table, are present in the pair of second semiconductor layers 306a.

Source/drain electrodes 307a and 307b composed of a conductive layer, such as Cr, are respectively formed on the second semiconductor layers 306a. Thus, the second semiconductor layers 306a, including a high concentration of impurity ions, are respectively formed between the source/drain electrodes 307a and 307b and the first semiconductor layer 305a. The portion of the first semiconductor layer 305a between the pair of second semiconductor layers 306a is the channel.

The source/drain electrodes 307a and 307b are protected by a passivation layer 309 of silicon oxide and/or silicon nitride that is formed over the source/drain electrodes 307a and 307b. A contact hole 311 for exposing the drain electrode 307b is formed in the passivation layer 309. The pixel electrode 310, such as an ITO layer, is formed on the passivation layer 309. The drain electrode 307b is connected to a pixel electrode 310 via the contact hole 311. When a gate signal is applied to the TFT through the gate line (not shown), a data signal is transmitted to the pixel electrode 310 through the source electrode 307a, the channel region, and the drain electrode 306a.

FIGS. 4A to 4E are cross-sectional views illustrating a fabrication process of the P-type TFT according to an embodiment of the present invention. Hereinafter, a fabrication process of a P-type polysilicon LCD device will be explained with reference to FIGS. 4A to 4E.

Figure 4A:
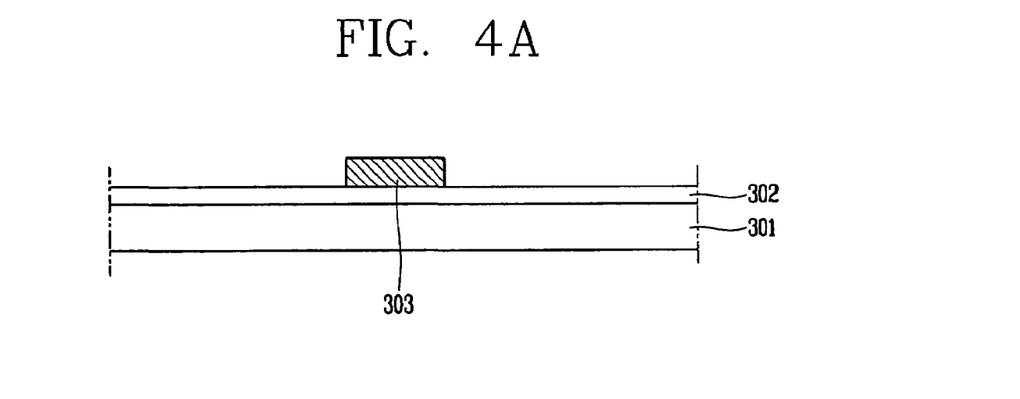
FIGS. 4A to 4E are views illustrating a fabrication process of the P-type TFT according to an embodiment of the present invention.

As shown in FIG. 4A, to prevent impurities of the transparent glass substrate 301 from penetrating into the semiconductor layer during thermal processing of a subsequent amorphous silicon layer, a buffer layer 302 of silicon oxide layer ($SiO_2$) is formed on the transparent substrate 301. The buffer layer 302 can be formed by a plasma enhanced chemical vapor deposition (PECVD).

Then, a metal layer is formed on the buffer layer 302 by a sputtering method. The metal layer is for forming a gate electrode 303. A metal having a high conductivity, such as Al, Mo and Cu, and having an excellent contact characteristic to the buffer layer can be used.

Then, a photoresist (not shown) is deposited on the metal layer, and a photolithography process is performed. The photolithography process is performed by an exposure/development process on the photoresist followed by an etching process of the metal layer. The etched metal layer is then cleaned to complete the formation of the gate electrode 303.

The etching process of the gate electrode 303 can be formed by a dry etching followed by a wet etching or a wet etching only. To prevent a short circuit from being generated while forming a thin film on the gate electrode, the gate electrode needs to have a tapered shape. Therefore, it is preferable to finally form the gate electrode with a wet etching having an anisotropic etching characteristic.

Figure 4B:
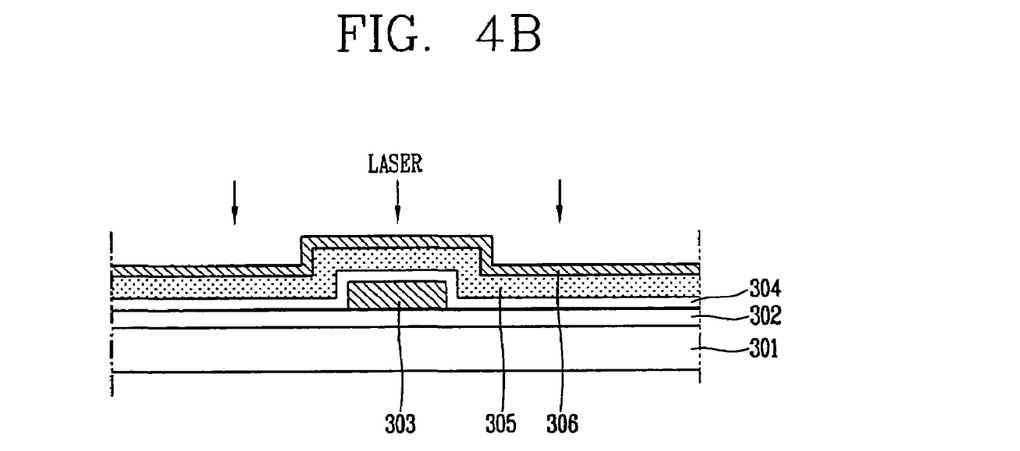

As shown in FIG. 4B, a gate insulating layer 304 for insulating the gate electrode 303 is deposited over the substrate 301 and the gate electrode 303. The gate insulating layer 304 is silicon oxide and/or silicon nitride that can be formed by a PECVD method. After forming the gate insulating layer 304, a first semiconductor layer that will serve as a channel region is formed on the gate insulating layer 304. The first semiconductor layer is in an intrinsic amorphous silicon state when being deposited on the gate insulating layer. After crystallization, the first semiconductor layer is transformed into an intrinsic crystalline silicon state.

After forming the first semiconductor layer 305, a second semiconductor layer 306 is formed on the first semiconductor layer 305 with a hydrogen compound including an element from the third group of the periodic table, such as $B_2H_6$, that is mixed in during a PECVD deposition of an amorphous silicon. As a result, the second semiconductor layer 306 including a high concentration of impurity ions is formed on the first semiconductor layer 305. In other words, the first semiconductor layer 305 and the second semiconductor layer 306 including a high concentration impurity ion are consecutively formed. If an N-type polysilicon LCD device is to be formed instead of an P-type polysilicon LCD device, ions of the fifth group, such as P, are mixed in during the PECVD deposition of the amorphous silicon.

Then, the first and second semiconductor layers 305 and 306 are crystallized. A method for crystallizing the semiconductor layers 305 and 306 includes a thermal processing method for heating a silicon layer in a furnace and a laser crystallization method for crystallizing a silicon layer by partially irradiation with a laser. In the preferred embodiment, the laser crystallization method for performing a crystallization is used at a temperature lower than the temperature where a glass of the substrate 301 starts to be melted.

The size of a grain of a polycrystalline silicon layer formed by the laser crystallization method is larger than that formed by the thermal processing method, thereby providing a device with excellent operation characteristics. This is because a grain boundary serves as a barrier that prevents progress of an electron or a hole. The larger the grain is, the less grain boundaries there are that a electron or hole will have to cross so the speed of the electron or the hole is faster.

When the second semiconductor layer 306 including a high concentration impurity ion and the first semiconductor layer 305 are crystallized by irradiating laser, the first semiconductor layer 305 is transformed into a first intrinsic crystalline semiconductor layer and the second semiconductor layer 306 is transformed into a second crystalline semiconductor layer that includes impurity ions. Crystallization by laser can be quickly performed at a high temperature. Since the amount of impurity ions injected into the second semiconductor layer is not much, very few impurity ions spread into the first semiconductor layer. Thus, even after crystallization, the first semiconductor layer remains intrinsic.

Figure 4C:
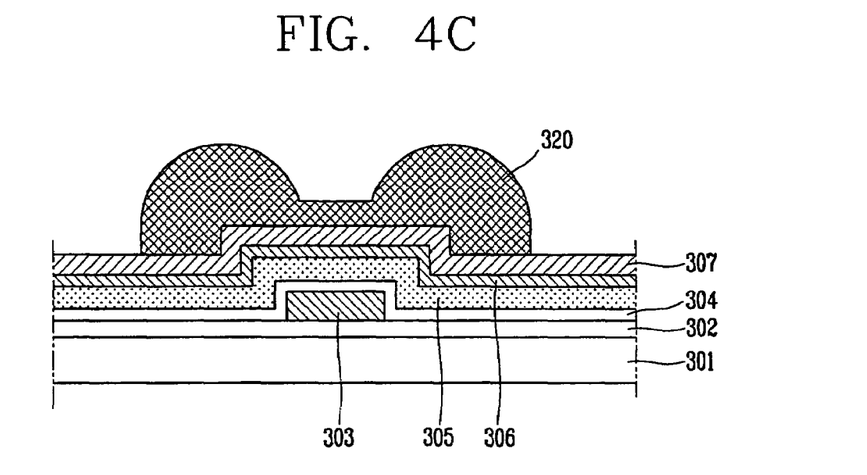
Figure 4D:
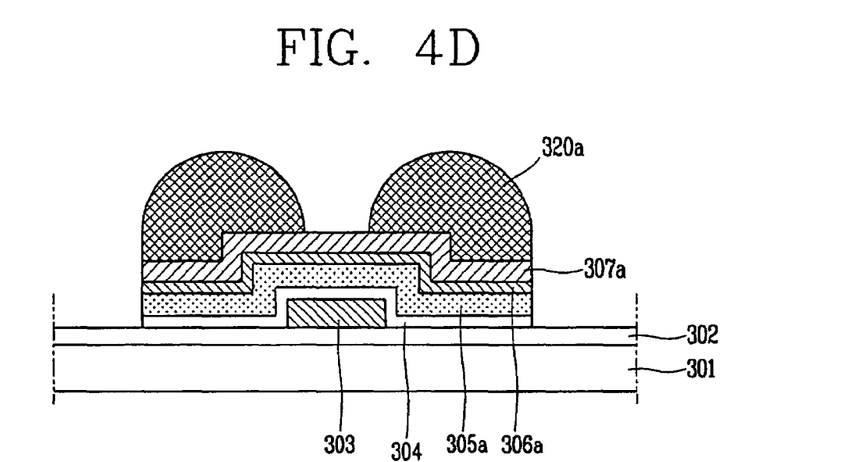

As shown in FIG. 4C, a conductive layer 307 for forming source/drain electrodes is formed over the crystallized semiconductor layers 305 and 306 by a sputtering method. Then, a photoresist is formed on the conductive layer 307, and then an exposure process of the photoresist is performed by using a second mask, which is a diffraction mask. Thus, the photoresist is patterned into a step shape in which a portion of the patterned photoresist corresponding to the channel region is relatively thin and a peripheral portion thereof becomes thick. Then, the conductive layer 307, the crystalline second semiconductor layer 306, and the crystalline first semiconductor layer 305 are consecutively etched until the gate insulating layer 304 is exposed. As shown in FIG. 4D, the active layer 305a is derived from the first semiconductor layer 305.

Then, a part of the photoresist pattern 320 formed by the diffraction exposure is removed by an ashing process, so that the photoresist over the channel region is removed, to thereby expose the conductive layer 307. By applying the photoresist 320a as a mask, the conductive layer 307a on the channel region and the crystallized second semiconductor layer 306a are etched to pattern the source/drain electrodes 307b and 307c and define a channel region.

Figure 4E:
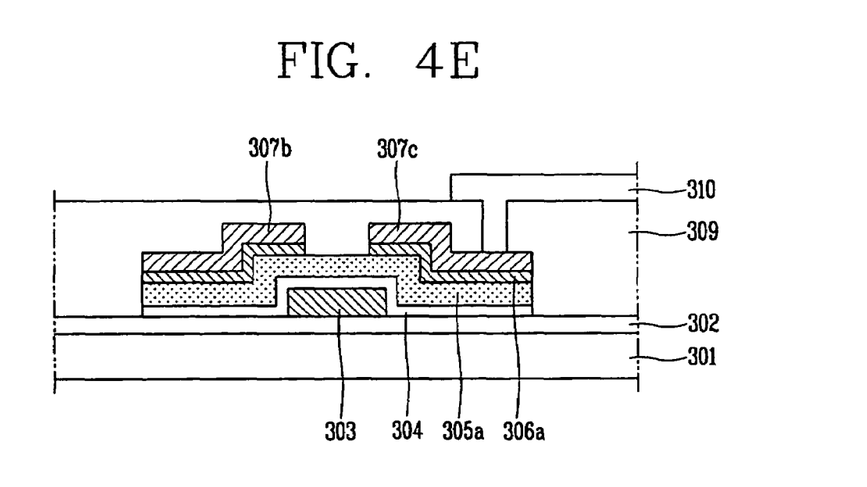

FIG. 4E shows a portion of the conductive layer 307a removed to form the source/drain electrodes 307b and 307c. Further, FIG. 4E shows a pair of second semiconductor layers 306a defined by removing a portion of the second semiconductor layer 306.

As shown in FIG. 4E, after forming the source/drain electrodes 307b and 307c, a passivation layer 309 of silicon nitride or silicon oxide is further formed by a PECVD method to protect the source/drain electrodes 307b and 307c.

Then, a contact hole 311 for exposing a portion of the drain electrode 307c is formed in the passivation layer 309, and a pixel electrode 310 of ITO or IZO is formed on the passivation layer and into the contact hole 309. Although not shown, an alignment layer for an initial alignment of liquid crystal can further be formed on the substrate where the pixel electrode 310 is formed. Further, a spacer for maintaining a cell gap between an upper substrate and a lower substrate of the LCD device can also be positioned on the substrate.

Figure 5:
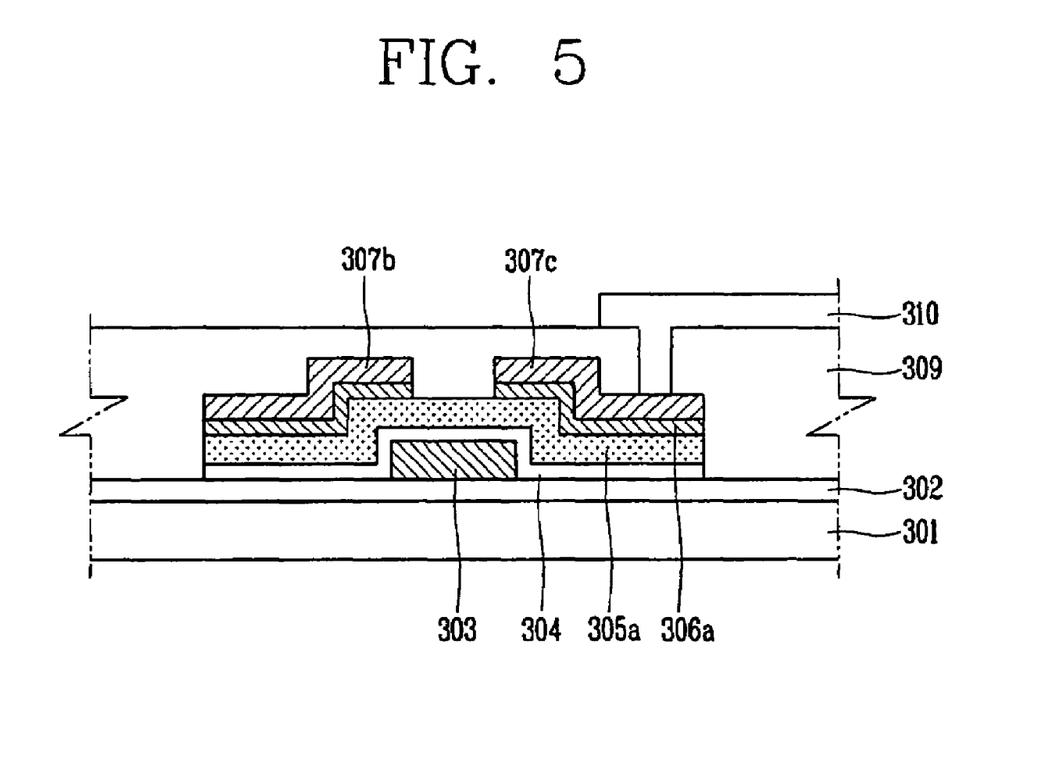
FIG. 5 is a cross-sectional view showing a structure of an N-type TFT according to an embodiment of the present invention.

In the embodiments of the present invention, a fabrication process of an LCD device having a P-type TFT was explained. Alternatively, an N-type TFT can be formed instead of a P-type TFT. FIG. 5 is a section view showing a structure of an LCD device having an N-type TFT according to an embodiment of the present invention. The N-type TFT is similar to the P-type TFT except that the crystalline second semiconductor layer 506a includes impurity ions of the fifth group of the periodic table, such as P.

According to the fabrication process of the N-type polycrystalline LCD device, the first semiconductor layer is formed, and then the second semiconductor layer is formed on the first semiconductor layer in a plasma chamber in a gas including impurity ions of the fifth group of the periodic table. As a result, the amorphous second semiconductor layer including impurity ions of the fifth group of the periodic table is formed on the first semiconductor layer.

Then, the amorphous first semiconductor layer and the second semiconductor layer including the impurity ions are crystallized. The next processes can be similarly performed as shown in the process of the P-type TFT above to render a n-type polycrystalline LCD device having a crystalline first semiconductor layer 305 and a pair of second semiconductor layers 506a.

In fabricating the crystalline silicon LCD device, a contact region between the source/drain electrodes and the active region is a pair of separated crystalline semiconductor layers, which have a high concentration of impurity ions. When compared to the related art fabrication process of a crystalline silicon LCD device in which source/drain regions are formed by an impurity ion injection, the number of masks for fabricating the LCD device is greatly reduced in the embodiments of the present invention. Accordingly, fabrication cost is reduced, productivity is increased, and yield is increased.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A fabrication method of a polysilicon LCD device comprising:
   forming a buffer layer on a substrate;
   forming a gate electrode over the buffer layer;
   forming a gate insulating layer over the gate electrode;
   forming a first semiconductor layer of an intrinsic amorphous silicon state on the gate insulating layer;
   sequentially forming a second semiconductor layer including a high concentration of impurity ions on the first semiconductor layer;
   crystallizing the first and second semiconductor layers by partially irradiation with a laser, wherein the crystallizing by the laser is instantaneously performed at a high temperature so that the first semiconductor layer is transformed into a first intrinsic crystalline semiconductor layer remaining an intrinsic semiconductor characteristic, wherein a spread of the impurity ion to the first semiconductor layer is little, and the second semiconductor layer is transformed into a second crystalline semiconductor layer including impurity ions, and the crystallizing process is applied at a temperature lower than the temperature where a glass of the substrate starts to be melted;
   forming source/drain electrodes on the second crystalline semiconductor layer, wherein the forming source/drain electrodes includes forming a conductive layer on the second crystalline semiconductor layer; forming a photoresist on the conductive layer; forming a photoresist pattern by applying a diffraction mask on the photoresist; patterning the conductive layer and the first and second semiconductor layers by using the patterned photoresist as a mask to define an active region; ashing the patterned photoresist; and removing the conductive layer and a portion of the second semiconductor layer by using the ashed photoresist as a mask to define a channel region;
   forming a passivation layer over the source/drain electrodes; and
   forming a pixel electrode connected to one of the source/drain electrodes.

2. The method of claim 1, wherein the removing the conductive layer and the second semiconductor layer includes:
   removing the conductive layer over the channel region; and
   removing a portion of the second semiconductor layer over the channel region.

3. The method of claim 1, wherein the first and second semiconductor layers include silicon.

4. The method of claim 1, wherein the dopants are one of the third group and the fifth group of the periodic table.

5. The method of claim 1, wherein the second semiconductor layer includes a doped semiconductor.

6. The method of claim 1, wherein the high concentration impurity ions are p-type impurity ions or n-type impurity ions.

7. A fabrication method of a polysilicon LCD device comprising:
   forming a buffer layer on a substrate;
   forming a gate electrode over the buffer layer;
   forming a gate insulating layer over the gate electrode;
   forming a first semiconductor layer of an intrinsic amorphous silicon state on the gate insulating layer;
   sequentially forming a second semiconductor layer including a high concentration of impurity ions on the first semiconductor layer, wherein the second semiconductor layer includes a doped semiconductor, and the high concentration impurity ions are p-type impurity ions or n-type impurity ions;
   crystallizing the first and second semiconductor layers by partially irradiation with a laser, wherein the crystallizing by the laser is instantaneously performed at a high temperature so that the first semiconductor layer is transformed into a first intrinsic crystalline semiconductor layer remaining an intrinsic semiconductor characteristic, wherein a spread of the impurity ion to the first semiconductor layer is little, and the second semiconductor layer is transformed into a second crystalline semiconductor layer including impurity ions, and the crystallizing process is applied at a temperature lower than the temperature where a glass of the substrate starts to be melted;
   forming source/drain electrodes on the second crystalline semiconductor layer, wherein the forming source/drain electrodes includes forming a conductive layer on the second crystalline semiconductor layer; forming a photoresist on the conductive layer; forming a photoresist pattern by applying a diffraction mask on the photoresist; patterning the conductive layer and the first and second semiconductor layers by using the patterned photoresist as a mask to define an active region; ashing the patterned photoresist; and removing the conductive layer and a portion of the second semiconductor layer by using the ashed photoresist as a mask to define a channel region;

forming a passivation layer over the source/drain electrodes; and forming a pixel electrode connected to one of the source/drain electrodes.

* * * * *